United States Patent [19]

Shimizu et al.

[11] Patent Number: 4,708,890

[45] Date of Patent: Nov. 24, 1987

[54] METHOD FOR PREVENTING POLYMER SCALE DEPOSITION ON THE REACTOR WALLS IN THE POLYMERIZATION OF ETHYLENICALLY UNSATURATED MONOMERS

[75] Inventors: Toshihide Shimizu, Chiba; Ichiro Kaneko, Ibaraki; Mikio Watanabe, Ibaraki; Yoshiteru Shimakura, Ibaraki, all of Japan

[73] Assignee: Shin-Etsu Chemical Co., Ltd., Tokyo, Japan

[21] Appl. No.: 886,721

[22] Filed: Jul. 18, 1986

[30] Foreign Application Priority Data

Jul. 18, 1985 [JP] Japan .................................. 60-158587

[51] Int. Cl.$^4$ ................................................. C08F 2/00
[52] U.S. Cl. .................................... 427/230; 427/239; 427/397.7; 427/397.8; 526/62
[58] Field of Search ..................... 427/239, 230, 397.7, 427/397.8; 526/62

[56] References Cited

U.S. PATENT DOCUMENTS

| | | | |
|---|---|---|---|
| 2,380,552 | 7/1945 | Simon et al. | 526/62 |
| 2,897,096 | 7/1959 | Karatzas et al. | 427/239 |
| 3,994,392 | 11/1976 | Kajiyama et al. | 427/239 |
| 4,016,341 | 4/1977 | Ogawa et al. | 526/62 |
| 4,539,230 | 9/1985 | Shimizu et al. | 427/239 |
| 4,564,537 | 1/1986 | Austin et al. | 427/239 |
| 4,622,245 | 11/1986 | Shimizu et al. | 427/239 |

*Primary Examiner*—Janyce A. Bell
*Attorney, Agent, or Firm*—Hopgood, Calimafde, Kalil, Blaustein & Judlowe

[57] ABSTRACT

The invention provides an efficient method for preventing polymer scale deposition on the reactor walls in the suspension or emulsion polymerization of an ethylenically unsaturated monomer, e.g. vinyl chloride and styrene, by coating the reactor walls, prior to introduction of the polymerization mixture, with an aqueous coating solution containing (a) a silicic acid compound, e.g. colloidal silicic acid, and (b) a phosphorous compound, e.g. phytic acid and polyphosphoric acid, in a specified weight proportion followed by drying.

4 Claims, No Drawings

METHOD FOR PREVENTING POLYMER SCALE DEPOSITION ON THE REACTOR WALLS IN THE POLYMERIZATION OF ETHYLENICALLY UNSATURATED MONOMERS

BACKGROUND OF THE INVENTION

The present invention relates to a method for preventing polymer scale deposition on the reactor walls in the polymerization of an ethylenically unsaturated monomer or, more particularly, to a method for preventing polymer scale deposition on the reactor walls and other surfaces coming into contact with the monomer in the polymerization of an ethylenically unsaturated monomer in an aqueous polymerization medium.

As is known, several types of polymerization procedures are undertaken in the preparation of polymers of ethylenically unsaturated monomers by polymerizing a variety of monomers including suspension polymerization, emulsion polymerization, solution polymerization, vapor-phase polymerization and bulk polymerization. A serious problem common to all of these polymerization methods is that the reactor walls and other surfaces coming into contact with the monomer in the course of the polymerization reaction are covered with polymer scale deposited thereon to cause various disadvantages.

Namely, polymer scale deposition on the reactor walls and other surfaces in the course of the polymerization reaction not only directly influences the yield of the polymer product but also to decrease the efficiency of cooling through the walls to adversely influence the productivity of the polymerization reactor. Moreover, the polymer scale sometimes falls off the reactor walls to be intermixed with the polymer product to cause heavy decrease in the product quality. When the monomer is toxic to human body as is the case with vinyl chloride monomer, in addition, a very serious problem is unavoidable in respect of the workers' health because the polymer scale deposited on the reactor walls must be removed to prepare for the next run of the polymerization while a considerably large amount of the unreacted monomer is usually adsorbed in the polymer scale if not to mention the disadvantage due to the large consumption of labor and time.

Limiting the type of the polymerization process to those carried out in an aqueous polymerization medium, i.e. suspension polymerization and emulsion polymerization, various proposals and attempts have been made in the prior art to prevent or reduce the amount of polymer scale deposition on the reactor walls, of which the major current is to provide a scale-preventing coating to the surface of the reactor walls. A typical class of the coating materials used in the prior art includes polar organic compounds such as amine compounds, quinone compounds, aldehyde compounds and the like. Although this method of coating is effective in its own way, a problem involved in the method consists in the use of an organic solvent to prepare a coating solution containing the polar organic compound because organic solvents are generally toxic to human body and in most cases inflammable to cause a danger of fire or explosion. When a water-soluble polar organic compound is used in place of the organic-soluble ones, on the other hand, the preventing effect of polymer scale deposition is too low to provide a practical solution of the problem.

The above mentioned method of coating with a polar organic compound is indeed effective to some extent when the type of the polymerization in an aqueous polymerization medium is suspension polymerization and the effectiveness by the coating treatment can be lasting over a certain length of time while the method is little effective in emulsion polymerization or in suspension polymerization in which an emulsifying agent is used in combination with a suspending agent.

In connection with the material forming the polymerization reactor, stainless steel-made polymerization reactors are conventionally used for the polymerization or, in particular, suspension polymerization of vinyl chloride while polymerization of styrene or copolymerization of styrene and acrylonitrile is usually performed in a glass-lined polymerization reactor despite the expensiveness of glass-lined reactors in comparison with stainless steel-made reactors because the amount of polymer scale deposition on the reactor walls would be too large to industrially practice the polymerization when a stainless steel-made polymerization reactor is used. Glass-lined polymerization reactors are, however, disadvantageous because the heat transfer coefficient through a glass-lined wall is remakably small and glass-lined polymerization reactors of large capacity can hardly be manufactured due to the ready breaking and difficulty in fabrication.

SUMMARY OF THE INVENTION

The present invention therefore has an object to provide a method for preventing polymer scale deposition on the reactor walls in the polymerization of an ethylenically unsaturated monomer in an aqueous polymerization medium without the above described problems and disadvantages in the prior art methods.

Thus, the method of the present invention for preventing polymer scale deposition on the reactor walls in the polymerization of an ethylenically unsaturated monomer in an aqueous polymerization medium comprises coating the surfaces of the inner walls of the polymerization reactor, prior to introduction of the polymerization mixture thereinto, with a mixture composed of (a) a silicic acid compound and (b) a phosphorus compound in the form of an aqueous solution and then drying the thus coated surfaces.

DETAILED DESCRIPTION OF THE PREFERRED EMBODIMENTS

As is understood from the above given summary, the object of the present invention can be achieved by coating the reactor walls with a specified coating composition which is, despite its very simple formulation and inexpensiveness, very effective to prevent the polymer scale deposition on the reactor walls and the effectiveness of the coating is exhibited not only in suspension polymerization but also in emulsion polymerization without being affected by the various factors in the polymerization such as the kind of the monomer, formulation of the polymerization mixture and so on. The method of the invention is so effective irrespective of the material of the polymerization reactor that polymer scale deposition is almost completely prevented on the walls of glass-lined reactors as well as stainless steel-made reactors. Acordingly, the inventive method provides a possibility to conduct a polymerization reaction in a stainless steel-made reactor in the field in which the polymerization reaction was hitherto undertaken only in a glass-lined reactor due to the problem of polymer scale build-up on the walls of a stainless steel-made reactor. Furthermore, the method of the present invention can be performed using an aqueous coating solution which is free from the problem and danger accompanying the use of an organic solution as the coating liquid. In other words, the essential ingredients (a) and (b) are both soluble in water to form an aqueous coating solution capable of fully exhibiting the desired effect of preventing polymer scale deposition.

The mechanism by which the method of the present invention exhibits the very remarkable effect is presumably that the ocmponents (a) and (b) in the coating solution, when applied to the reactor walls and dried there, react with each other to form a coating film which is no longer soluble in water or hardly soluble in water and firmly adheres to the surface exhibiting an effect of preventing adsorption of any species in the polymerization mixture on to the reactor walls.

The silicic acid compound as the component (a) in the coating mixture used in the inventive method is exemplified by colloids of silicic acid, lithium silicate and the like, orthosilicic acid, metasilicic acid, mesodisilicic acid, mesotrisilicic acid, mesotetrasilicic acid, sodium metasilicate, sodium orthosilicate, sodium disilicate, sodium tetrasilicate, potassium metasilicate, potassium hydrogendisilicate, lithium orthosilicate, hexalithium orthodisilicate, water glass, 12-silicotungstic acid, is-12-silicotungstic acid, 10-silicotungstic acid, potassium 12-silicotungstate, potassium iso-12-silicotungstate, potassium 10-silicotungstate, soduum 12-silicotungstate, sodium iso-12-silicotungstate, silicomolybdic acid, potassium silicomolybdate, sodium silicomolybdate and other water-soluble silicic acid and silicate compounds.

On the other hand, the phosphorus compound as the component (b) used in combination with the above named silicic acid compounds is exemplified by oxyacids of phosphorus and salts thereof such as orthophosphoric acid, pyrophosphoric acid, trimetaphosphoric acid, tetrametaphosphoric acid, monophosphorous acid pyrophosphorous acid polymetaphosphorous acid, polyphosphoric acid, hypophosphoric acid, sodium orthophosphate, potassium dihydrogenphosphate, dipotassium hydrogenphosphate, ammonium dihydrogenphosphate, diammonium hydrogenphosphate, ammonium orthophosphate, ammonium magnesium phosphate, sodium pyrophosphate, sodium hydrogenpyrophosphate, sodium metaphosphate, sodium hyperphosphate and the like, phytic acid and salts thereof by converting one or more of the hydroxy groups of the six phosphoric acid residues of phytic acid such as tetra(propylamine) salt of phytic acid, tetra(butylamine) salt of phytic acid, tetra(monoethanolamine) salt of phytic acid, diammonium salt of phytic acid, tetraammonium monosodium salt of phytic acid, tetraammonium disodium salt of phytic acid and the like, organophosphorus compounds such as triethyl phosphine, trimethyl phosphine oxide, triethyl phosphine oxide, ethyl phosphonous acid, dimethyl phosphinic acid, dihexyl phosphinic acid, oxymethyl phosphonic acid, phenyl phosphine, diethyl phenyl hypophosphonate, phenyl phosphonous acid, phenyl phosphonic acid, n-butyl phosphate, diphenyl phosphate, tributyl phosphate, trimethyl phosphate, trimethyl phosphite and the like, and others.

In practicing the method of the present invention, a coating liquid is prepared which is an aqueous solution containing both of the above described components (a) and (b) dissolved in water in a concentration suitable for the coating work on the reactor walls. The concentration should be at least 0.01% by weight as the total of the components (a) and (b). When the concentration is lower than that, a single coating with the solution can hardly give a coating film of little solubility in water on the surface as formed of the components (a) and (b). Although the concentration is not particularly limitative in respect of the upper limit, it should usually not exceed about 5% by weight since an excessively thick coating film has no particularly advantageous effect rather with an economical disadvantage or some inconvenience is caused in the coating work when the concentration is extremely high. The proportion of the component (a) and component (b) in the coating solution is also important in order to obtain a full effect of preventing polymer scale deposition. In this regard, the weight proportion of the component (a) to component (b) should be in the range from 100:5 to 100:400 or, preferably, from 100:20 to 100:300.

The solvent used for the preparation of the coating solution is not limited to water but any organic solvent freely miscible with water can be used as combined with water. For example, the solution can be prepared by use of a mixture of water and an organic solvent such as an alcohol or ester depending on the nature of the solutes dissolved therein. The combined use of an organic solvent may be sometimes advantageous in respect of accelerating drying of the coating solution applied to the reactor walls.

The coating solution applied to the reactor walls and other surfaces coming into contact with the monomer in the course of the polymerization reaction should be dried before introduction of the polymerization mixture into the reactor. The procedure for drying is not particularly limitative and the wet surface with the coating solution may be blown with hot air to accelerate drying or, alternatively, the reactor walls are heated in advance at a temperature of, for example, 40° to 100° C. and then coated with the coating solution to effect rapid drying of the solution as applied. When the coated surface is completely dried, the components (a) and (b) in the solution are combined and form a water-insoluble coating film firmly adhering to the surface. Drying of the coated surface should preferably be followed by washing with water. The effect of the coating film formed on the surface is never decreased by this washing with water by virtue of the insolubility of the coating film in water. The desired effect of preventing polymer scale depositon can be fully exhibited even when the amount of coating is very low but the coating amount should preferably be at least 0.001 $g/m^2$ as dried on the coated surface.

The method of the present invention is applicable to both of suspension polymerization and emulsion polymerization of ethylenically unsaturated monomers fully exhibiting the desired effect. Furthermore, the effect obtained by the method of the present invention is not decreased even when the polymerization mixture contains various kinds of additives conventionally used in the polymerization of ethylenically unsaturated monomers including suspending agents, e.g. partially saponified polyvinyl alcohol and methyl cellulose, emulsifying agents, fillers, e.g. calcium carbonate and titanium dioxide, stabilizers, e.g. tribasic lead sulfate, calcium stearate, dibutyltin dilaurate and dioctyltin mercaptide, lubricants, e.g. rice wax and stearic acid, plasticizers, e.g. dioctyl phthalate and dibutyl phthalate, chain transfer agents, e.g. trichloroethylene and mercaptans, pH controlling agents, polymerization initiators, e.g. diisopropyl peroxy dicarbonate, $\alpha,\alpha'$-azobis-2,4-dimethyl valeronitrile, lauroyl peroxide, potassium persulfate, cumene hydroperoxide and p-menthane hydroperoxide, and others.

The method of the present invention is applicable to the homo- and copolymerization of various kinds of known ethylenically unsaturated monomers in an aqueous polymerization medium. Exemplary of the ethylenically unsaturated monomers to which the method is applicable are vinyl halides, e.g. vinyl chloride, vinyl esters, e.g. vinyl acetate and vinyl propionate, acrylic and methacrylic acids as well as esters and salts thereof, maleic and fumaric acids as well as esters thereof and maleic anhydride, dienic monomers, e.g. butadiene, chloroprene and isoprene, styrene, acrylonitrile, vinylidene halides, vinyl ethers and so on. The method of the invention, however, exhibits the most remarkable effect when it is applied to the preparation of a homopolymer or copolymer of vinyl halides, e.g. vinyl chloride, and/or vinylidene halides, e.g. vinylidene chloride, as the principal monomeric constituent of the polymerization mixture in suspension polymerization.

In the following, the method of the present invention is described in more detail by way of Examples and Comparative Examples. In the tables given below, the experiments indicated by the asterisked numbers were undertaken for comparative purpose, the other experiments being for the inventive method.

EXAMPLE 1

(Experiments No. 1 to No. 24).

Coating solutions were prepared each by dissolving the component (a) and component (b) indicated in Table 1 below in an indicated proportion in water or in a mixture of water and an indicated organic solvent. The concentration of the solution was 1.0% by weight as a total of the components (a) and (b).

The coating solution was applied to the inner walls of a stainless steel-made polymerization reactor of 100 liter capacity and the surface of the stirrer coming into contact with the monomer during polymerization and dried by heating at 50° C. for 10 minutes followed by washing with water. Into the thus coated polymerization reactor were introduced 26 kg of vinyl chloride monomer, 52 kg of water, 26 g of a partially saponified polyvinyl alcohol and 8 g of $\alpha,\alpha'$-dimethyl valeronitrile to form a polymerization mixture which was heated at 57° C. for 10 hours under agitation to effect the polymerization reaction. After completion of the polymerization reaction, the polymerizate slurry was discharged out of the reactor and the amount of the polymer scale deposited on the reactor walls was determined to give the results shown in Table 1.

EXAMPLE 2

(Experiments No. 25 to No. 33).

The inner walls of a stainless steel-made polymerization reactor of 50 liter capacity and the surface of the stirrer thereof coming into contact with the monomer were coated with one of the coating solutions prepared in some of the experiments undertaken in Example 1 and dried by heating at 50° C. for 15 minutes followed by washing with water.

TABLE 1

| Experiment No. | Silicic acid compound (a) | Phosphorus compound (b) | (a)/(b) weight ratio | Solvent (weight ratio) | Polymer scale, g/m² |
|---|---|---|---|---|---|
| 1* | None | None | — | — | 1200 |
| 2* | Colloidal silicic acid | None | — | Water/i-BuOH (95:5) | 800 |
| 3* | Orthosilicic acid | None | — | Water/i-BuOH (95:5) | 900 |
| 4* | 10-Silicotungstic acid | None | — | Water | 850 |
| 5* | None | Phytic acid | — | Water | 1100 |
| 6* | None | Polyphosphoric acid | — | Water | 1100 |
| 7* | None | Trimetaphosphoric acid | — | Water | 1200 |
| 8 | Colloidal silicic acid | Phytic acid | 100:100 | Water/MeOH (50:50) | 2 |
| 9 | Colloidal silicic acid | Polyphosphoric acid | 100:80 | Water/EtOH (70:30) | 4 |
| 10 | Colloidal silicic acid | Phytic acid di(triethanol amine) | 100:300 | Water/i-BuOH (96:4) | 5 |
| 11 | Colloidal silicic acid | Trimetaphosphoric acid | 100:20 | Water/MeOH (30:70) | 12 |
| 12 | Orthosilicic acid | Ammonium magnesium phosphate | 100:130 | Water | 17 |
| 13 | Orthosilicic acid | Sodium polyphosphate | 100:20 | Water/acetone (70:30) | 10 |
| 14 | 10-Silicotungstic acid | Hypophosphoric acid | 100:150 | Water | 20 |
| 15 | Metasilicic acid | Sodium phosphate | 100:180 | Water/MeOH (80:20) | 23 |
| 16 | Sodium silicate | Pyrophosphoric acid | 100:100 | Water | 25 |
| 17 | Colloidal lithium silicate | Phytic acid | 100:100 | Water/MeOH (90:10) | 10 |
| 18 | Colloidal lithium silicate | Polymetaphosphoric acid | 100:110 | Water | 9 |
| 19 | Colloidal lithium silicate | Disodium phytic acid | 100:150 | Water | 9 |
| 20 | Colloidal silicic acid | Tetrametaphosphoric acid | 100:50 | Water/MeOH (30:70) | 8 |
| 21 | Colloidal silicic acid | Phytic acid di(ethyl-amine) | 100:70 | Water/MeOH (20:80) | 4 |
| 22 | Trimetaphosphoric acid | Ethylphosphine oxide | 100:25 | Water/MeOH (80:20) | 20 |
| 23 | Mesotetrasilicic cid | Trimethyl phosphate | 100:20 | Water/MeOH (10:90) | 25 |
| 24 | Orthosilicic acid | Ethyl phosphonous acid | 100:23 | Water/EtOH (10:90) | 23 | i-BuOH: isobutyl alcohol; MeOH: methyl alcohol; EtOH: ethyl alcohol

Thereafter, a polymerization mixture was formed by introducing 15 kg of water, 15 kg of styrene monomer, 75 g of calcium phosphate, 2.4 g of sodium dodecylbenzene sulfonate and 33 g of benzoyl peroxide and the polymerization mixture was heated at 90° C. for 10 hours under agitation to effect the polymerization of styrene. After completion of the polymerization reaction, the polymerization slurry was discharged out of the polymerization reactor and the amount of the polymer scale deposited on the reactor walls was determined to give the results shown in Table 2, in which each of the coating solutions is indicated by the No. of the corresponding experiment undertaken in Example 1 using the same coating solution.

TABLE 2

| Experiment No. | Coating solution prepared in | Amount of scale deposition, g/m² |
|---|---|---|
| 25* | (None) | 1000 |
| 26* | Experiment No. 2 | 900 |
| 27* | Experiment No. 5 | 1000 |
| 28 | Experiment No. 8 | 1 |
| 29 | Experiment No. 9 | 3 |
| 30 | Experiment No. 13 | 10 |
| 31 | Experiment No. 15 | 15 |
| 32 | Experiment No. 17 | 5 |
| 33 | Experiment No. 21 | 2 |

EXAMPLE 3

(Experiments No. 34 to No. 41).

The inner walls of a glass-lined polymerization reactor of 20 liter capacity and the surface of the stirrer thereof coming into contact with the monomer were coated with one of the coating solutions prepared in some of the experiments undertaken in Example 1 and dried by heating at 60° C. for 20 minutes followed by washing with water. Thereafter, a polymerizaton mixture was formed in the reactor by introducing 9.5 kg of water, 240 g of sodium dodecylbenzene sulfonate, 15 g of tert-dodecyl mercaptan, 2.1 kg of butadiene, 2.8 kg of methyl methacrylate, 320 g of styrene and 16 g of potassium persulfate and the polymerization mixture was heated at 60° C. for 10 hours under agitation to effect the copolymerization of the monomers. After completion of the polymerization reaction, the latex-like polymerizate slurry was discharged out of the reactor and the amount of the polymer scale deposited on the reactor walls was determined to give the results shown in Table 3 below, in which each of the coating solutions is indicated by the No. of the corresponding experiment undertaken in Example 1 using the same coating solution.

TABLE 3

| Experiment No. | Coating solution prepared in | Amount of scale deposition, g/m² |
|---|---|---|
| 34* | (None) | 410 |
| 35* | Experiment No. 2 | 400 |
| 36* | Experiment No. 5 | 410 |
| 37 | Experiment No. 8 | 1 |
| 38 | Experiment No. 9 | 7 |
| 39 | Experiment No. 13 | 15 |
| 40 | Experiment No. 17 | 14 |
| 41 | Experiment No. 20 | 6 |

What is claimed is:

1. A method for preventing polymer scale deposition on the reactor walls in the polymerization of an ethylenically unsaturated mononer in an aqueous polymerization medium which comprises coating the surface of the reactor walls with a coating solution containing (a) a silicic acid compound and (b) a phosphorous compound selected from the group consisting of phytic acid, polyphosphoric acid, di(triethanolamine) salt of phytic acid, trimetaphosphoric acid, ammonium magnesium phosphate, sodium polyphosphate, hyperphosphoric acid, sodium phosphate, pyrophosphoric acid, polymetaphosphoric acid, disodium salt of phytic acid, tetrametaphosphoric acid, di(ethylamine) salt of phytic acid, ethyl phosphine oxide, trimethyl phosphate and ethyl phosphorous acid, in combination dissolved in an aqueous solvent and then drying the thus coated surface prior to introduction of the polymerization mixture into the polymerization reactor.

2. The method as claimed in claim 1 wherein the silicic acid compound is selected from the group consisting of colloidal silicic acid, orthosilicic acid, 10-silicotungstic acid, metasilicic acid, sodium orthosilicate, colloidal lithium silicate and mesotetrasilicic acid.

3. The method as claimed in claim 1 wherein the weight ratio of the silicic acid compound to the phosphorus compound in the coating solution is in the range from 100:5 to 100:400.

4. The method as claimed in claim 1 wherein the aqueous solvent is water or a mixture of water with an organic solvent freely miscible with water.

* * * * *